US012358432B2

(12) United States Patent
Nishiguchi et al.

(10) Patent No.: US 12,358,432 B2
(45) Date of Patent: Jul. 15, 2025

(54) STORAGE STRUCTURE FOR WORKING MACHINE

(71) Applicant: Caterpillar SARL, Geneva (CH)

(72) Inventors: Tetsuo Nishiguchi, Akashi (JP); Kazumasa Matsumura, Akashi (JP)

(73) Assignee: Caterpillar SARL, Geneva (CH)

( * ) Notice: Subject to any disclaimer, the term of this patent is extended or adjusted under 35 U.S.C. 154(b) by 248 days.

(21) Appl. No.: 17/527,565

(22) Filed: Nov. 16, 2021

(65) Prior Publication Data
US 2022/0153198 A1 May 19, 2022

(30) Foreign Application Priority Data

Nov. 18, 2020 (JP) ................. 2020-191809

(51) Int. Cl.
B60R 5/00 (2006.01)
E02F 9/16 (2006.01)

(52) U.S. Cl.
CPC . B60R 5/00 (2013.01); E02F 9/16 (2013.01)

(58) Field of Classification Search
CPC ....... E02F 9/0858; E02F 9/0833; B60R 9/065
See application file for complete search history.

(56) References Cited

U.S. PATENT DOCUMENTS

| 5,316,358 | A  | * | 5/1994 | Payne ...................... B60R 5/00 |
| | | | | 296/24.45 |
| 6,974,170 | B2 | * | 12/2005 | Mulvihill .............. B60P 7/0892 |
| | | | | 224/42.33 |
| 10,161,107 | B2 | * | 12/2018 | Namai .................. E02F 9/0833 |
| 10,625,687 | B1 | * | 4/2020 | Todd ........................ B60R 9/065 |
| 11,001,205 | B2 | * | 5/2021 | Reed, III ............... B60R 9/065 |
| 12,127,508 | B2 | * | 10/2024 | Needham ................ B27B 25/00 |

FOREIGN PATENT DOCUMENTS

| EP | 3546660 A1 | * | 10/2019 | ............. B01D 53/94 |
| JP | H10266264 A | * | 10/1998 | |
| JP | 2000045332 A | * | 2/2000 | ............ E02F 9/0833 |
| JP | 2003268807 A | | 9/2003 | |
| JP | 2005098013 A | | 4/2005 | |
| JP | 2012172332 A | | 9/2012 | |
| JP | 2015132078 A | | 7/2015 | |
| JP | 2016204880 A | | 12/2016 | |
| JP | 2019056252 A | | 4/2019 | |

* cited by examiner

Primary Examiner — Scott T McNurlen

(57) ABSTRACT

PROBLEM: To provide a toolbox of a working machine capable of storing a long object.
SOLUTION: A toolbox has a plurality of storage sections each having an opening that permits access to an interior, and successively adjacently arranged. The toolbox comprises a storage space section that makes any ones of a plurality of interiors adjoining one another of the plurality of storage sections communicate with one another, and permits access from an access opening different from each opening.

5 Claims, 5 Drawing Sheets

STORAGE STRUCTURE FOR WORKING MACHINE

This application claims priority under 35 USC § 119 and the Paris Convention to Japanese Patent Application No. 2020191809 filed on Nov. 18, 2020 . . .

TECHNICAL FIELD

The present invention relates to a storage structure for working machine provided on a machine body of the working machine.

BACKGROUND ART

Vehicles equipped with forestry attachments attached to working machines using hydraulic shovels, etc. as a base are used at forestry sites. A harvester, known as a forestry attachment, is set up at roots of upright trees, for example, and employed in operations for felling the trees cut with a built-in chainsaw, delimbing, cutting to a predetermined length, and other operations.

Chainsaws used for attachments such as harvesters require replacement of guide blades when they are worn or damaged. Some guide blades among longer ones may have a maximum felling diameter that may exceed 1 m, depending on the sizes of the attachments.

Conventionally, some working machines are provided with a toolbox acting as a storage structure for storing tools and the like (see, Patent Literatures 1 and 2, for example). However, such a toolbox has difficulty in storing a long object such as a blade. Consequently, in order to replace with a spare guide blade on site, it is necessary to transport another guide blade separately.

PRIOR ART LITERATURES

Patent Literatures

PATENT LITERATURE 1: Japanese Patent Application Laid-Open No. 2003-268807.
PATENT LITERATURE 2: Japanese Patent Application Laid-Open No. 2005-98013.

SUMMARY OF THE INVENTION

Problems to be Solved by the Invention

As described above, in a working machine, it is desired to equip with a toolbox capable of storing a long object.

The present invention has been made in view of such a point, and an object of the present invention is to provide a storage structure for working machine capable of storing a long object.

Means for Solving the Problems

The invention according to claim 1 is a storage structure for working machine provided in a machine body of the working machine, the storage structure for working machine comprising: a plurality of storage sections each having an opening that permits access to an interior, and successively adjacently arranged; and a storage space section that makes any ones of a plurality of interiors adjoining one another of the plurality of storage sections communicate with one another, and permits access from an access opening different from each opening.

The invention according to claim 2 is the storage structure for working machine according to claim 1, wherein the plurality of storage sections are successively adjacently arranged from an outer edge portion of the machine body toward a predetermined maintenance section side of the machine body, and the height of the storage section closer to the predetermined maintenance section is set to be higher.

The invention according to claim 3 is the storage structure for working machine according to claim 1 or 2, wherein the plurality of storage sections are arranged in the side of the machine body, each opening is formed so as to allow access to the interior of each storage section from the side of the machine body, and the storage space section is formed so as to communicate with at least the center side of the machine body width of any ones of a plurality of interiors adjoining one another of the plurality of storage sections.

Favorable Effects of the Invention

According to the present invention in claim 1, a storage space section can be made as a length extending through the length of interiors of a plurality of storage sections, and thereby a long object can be stored in the storage space section through an access opening.

According to the present invention in claim 2, steps for allowing the access to a maintenance section from an outer edge portion of a machine body can be configured by the storage sections, whereby enabling easy access to the maintenance section by using these steps as catwalks, and therefore enabling maintenance of the maintenance section to be performed.

According to the present invention in claim 3, a long object stored in the storage space section never interferes with the access to the interiors of respective storage sections.

DETAILED DESCRIPTION

Hereinafter, the present invention will be described in detail in accordance with an embodiment illustrated in FIGS. 1A, 1B and 2 to 5.

Figure 5:
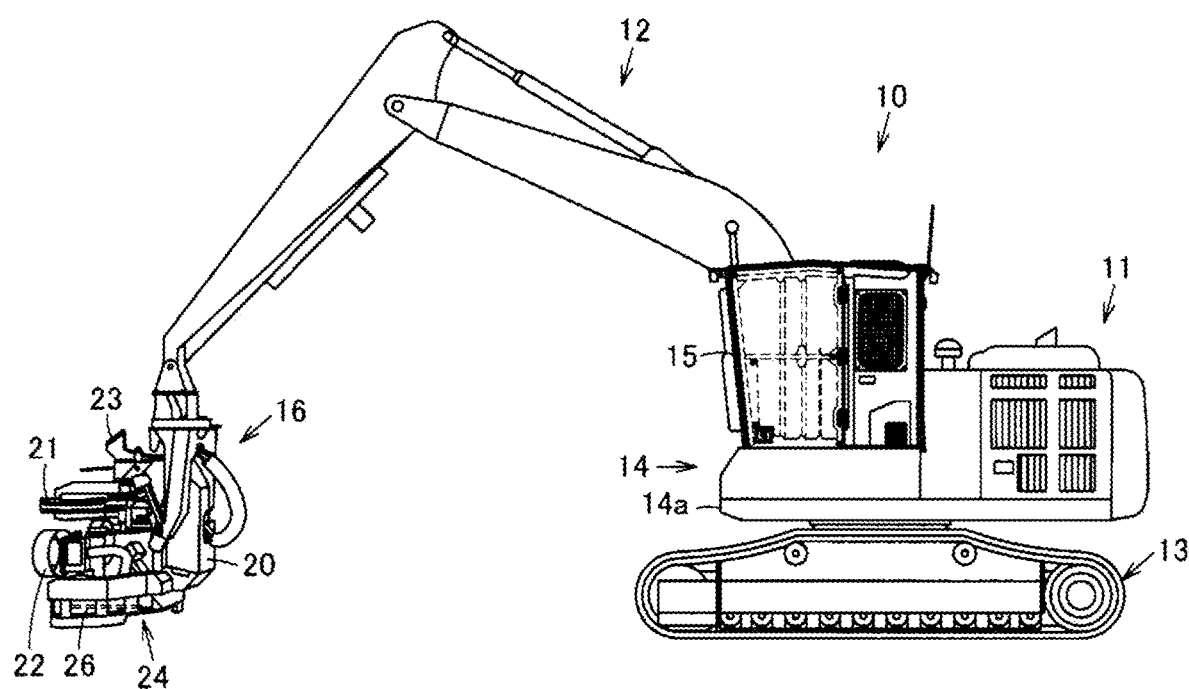
FIG. 5 is a side view illustrating an example of the same working machine as above.

FIG. 5 illustrates a working machine 10. The working machine 10 is a working machine for forestry applications which is also called a forestry machine or the like. As the working machine 10, in the present embodiment, a hydraulic shovel-based machine, which is a revolving type working machine, will be described as an example. In the illustrated example, the working machine 10 comprises a machine body 11 and a working device 12 which is a work arm movably provided on the machine body 11.

In the present embodiment, the machine body 11 has a lower traveling body 13 that can travel by crawlers, tires, etc.; an upper revolving body 14 that is revolvably provided on the lower traveling body 13, and a cab 15, which is provided on the upper revolving body 14, surrounds a driver's seat occupied by an operator; further includes the working device 12 arranged at the central portion in a width direction of the upper revolving body 14, and the cab 15 located on one side of the upper revolving body 14 relative to the working device 12, on the left side in an illustrated example. Respective directions such as up and down, right and left, and front and back, and more take an operator's viewpoint as a reference. Then, respective parts of the working machine 10 are actuated by fluid pressure actuators. The fluid pressure actuators are, for example, a hydraulic cylinder, a hydraulic motor, etc., and a hydraulic oil being a working fluid discharged from a pump operated by an engine mounted on the machine body 11 is supplied and discharged by performing flow rate control and direction control by a control valve according to the operator's operation, thereby enabling each actuation.

An attachment 16 is attached to the working device 12. The attachment 16 is an attachment for forestry applications, which is also called a harvester or the like in the illustrated example. The attachment 16 comprises an attachment main body section 20 that is movably attached to the tip of the working device 12, and in the attachment main body section 20, a paired gripper arms 21, a paired feed rollers 22, a cutter 23, and a chainsaw 24 acting as a cutting device are movably arranged. Then, for example, the attachment 16 causes trees to fall down by the chainsaw 24 while the trees for felling target are gripped by the pair of gripper arms 21, and presses to hold the pair of feed rollers 22 against the surface of the lumber which is the felled workpiece, feeds the lumber in a longitudinal direction, crashes branches by the cutter 23, and cuts (cross-cutting) to a desired length by the chainsaw 24.

The chainsaw 24 has a cutting attachment 26 that can be advanced and retreated by the fluid pressure actuator, for example, and the cutting attachment 26 is driven by an electric motor that acts as a drive source. The cutting attachment 26 is configured such that an endless saw chain 29 is wound around an outer circumference of a guide blade 28 which is a long object illustrated in FIG. 4, and wood felling or cutting can be enabled by advancing and retreating the cutting attachment 26 in a direction crossing the longitudinal direction of the wood being fed out by the feed rollers 22 illustrated in FIG. 5, while the saw chain 29 is being guided and rotated along the outer circumference of the guide blade 28 by receiving power generated by the electric motor.

Figure 4:
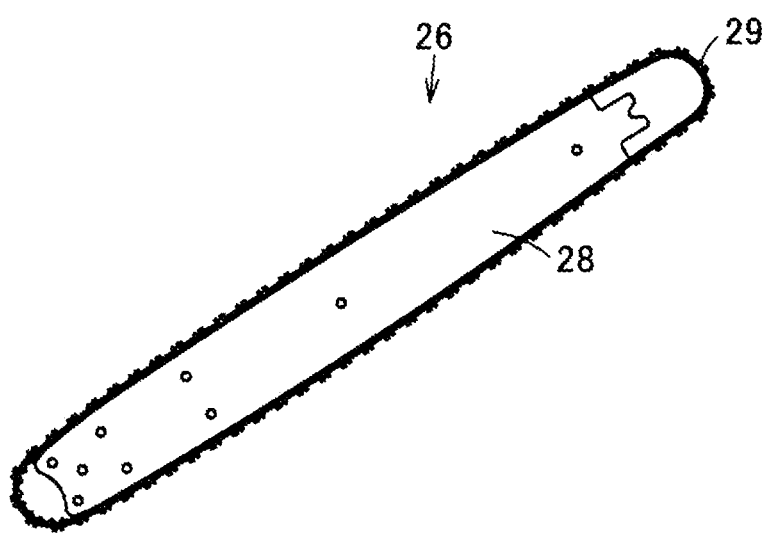
FIG. 4 is a perspective view illustrating an example of a long object stored in the same storage structure as above.

The guide blade 28 illustrated in FIG. 4 is a long object whose length is set according to the size of the attachment 16 (FIG. 5) selected according to a required maximum felling diameter. The guide blade 28 can be detachably attached with respect to the attachment 16 (FIG. 5) and can be replaced at the time of wear or damage.

Figure 2:
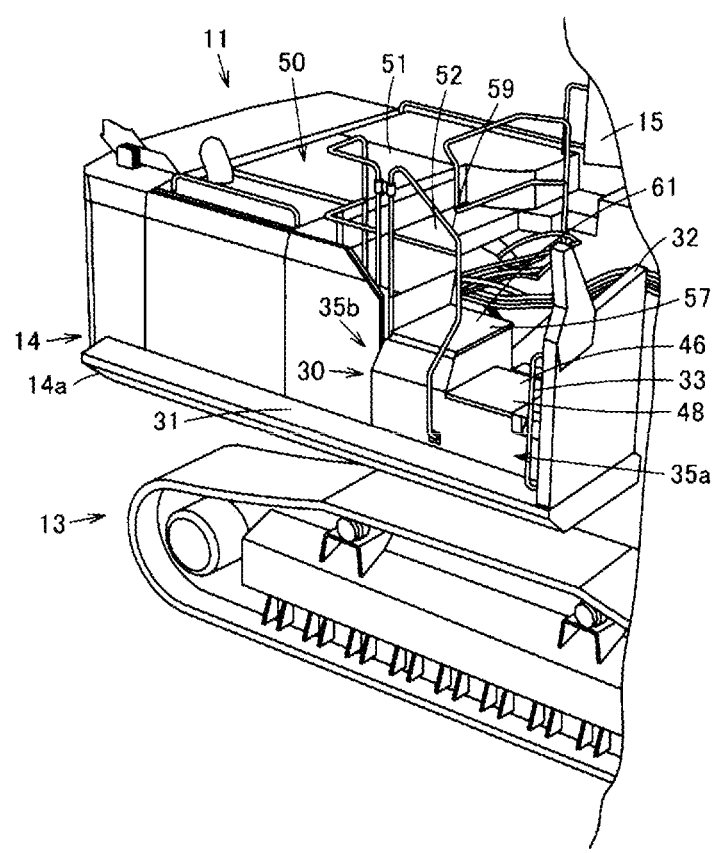
FIG. 2 is a perspective view illustrating a portion of the machine body of the working machine comprising the same storage structure as above.
Figure 3:
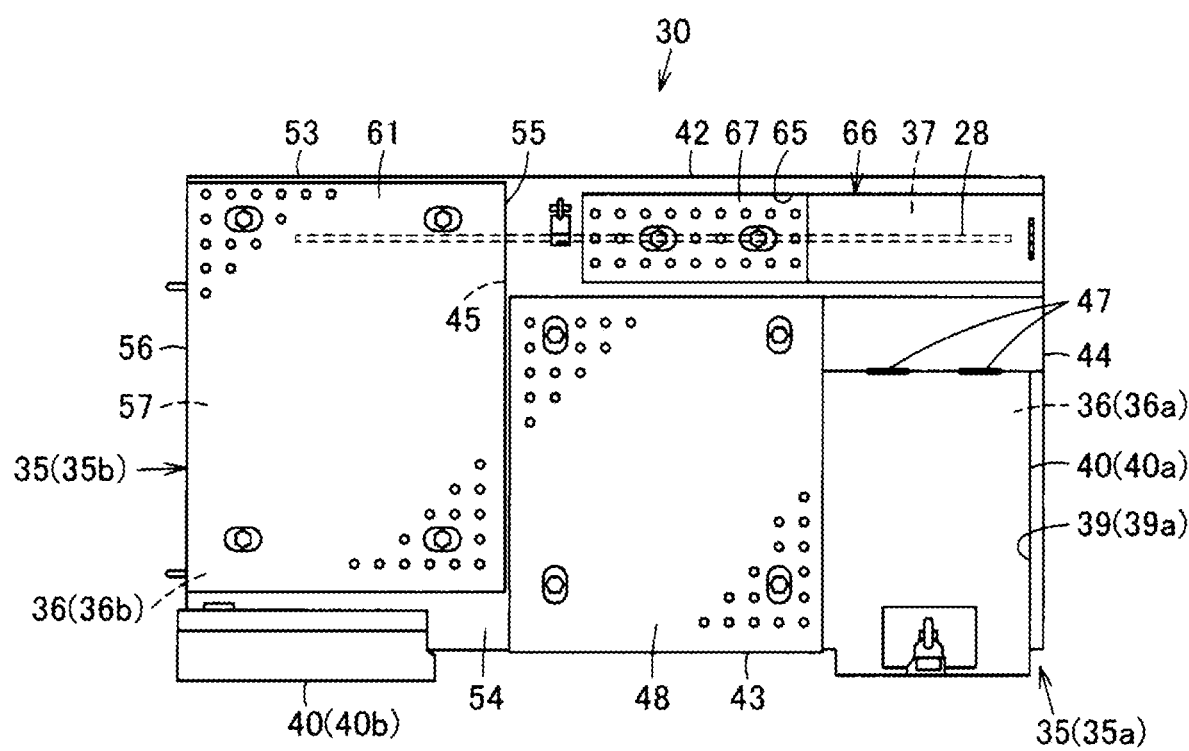
FIG. 3 is a plan view illustrating the same storage structure as above.

In the present embodiment, a spare guide blade 28 for replacement can be stored in a toolbox 30 acting as a storage structure provided in the upper revolving body 14 of the machine body 11 illustrated in FIG. 2. The toolbox 30 is arranged on the other side of the upper revolving body 14 relative to the working device 12 (FIG. 5), on the right side in the illustrated example, i.e., on the opposite side to the cab 15 (FIG. 5). In the illustrated example, the toolbox 30 is arranged adjacent to the left side of a side catwalk section 31 formed on the right edge portion of a revolving frame 14a of the upper revolving body 14. Further, in the present embodiment, the front surface of the toolbox 30 is covered with a protective member (guard member) 32. The protective member 32 is formed in a plate shape that protrudes upward from the revolving frame 14a of the upper revolving body 14, for example. A handrail 33, which is a gripped member that is gripped when ascending/descending to/from the side catwalk section 31, is attached to the protective member 32.

Then, as illustrated in FIGS. 1A, 1B, 2 and 3, the toolbox 30 has a plurality of storage sections 35, and a storage space section 37 that communicates with a plurality of space sections 36 of interiors at least adjoining one another of the plurality of storage sections 35. A long object such as the spare guide blade 28 is stored in the storage space section 37.

The storage sections 35 comprise respective openings 39, which permit the access to the space sections 36 of the interiors from these openings 39. Further, the openings 39 can be opened/closed by respective opening/closing bodies 40.

In the present embodiment, a first storage section 35a and a second storage section 35b are set in the storage sections 35.

The first storage section 35a is located at the forefront of the toolbox 30. In the present embodiment, the first storage section 35a is located on the right front portion of the upper revolving body 14, which is the outer edge portion of the machine body 11.

In the illustrated example, the first storage section 35a is formed in a box shape. The first storage section 35a has a pair of left and right-side plates 42, 43, a pair of front and rear end plates 44, 45, and a ceiling plate 46, and is mounted on the revolving frame 14a of the upper revolving body 14 so as to protrude upward from the side catwalk section 31. In the present embodiment, the first storage section 35a has a longitudinal shape in the front-rear direction. Then, the first storage section 35a has a first opening 39a being one opening, and permits access from the outside of the toolbox 30 via a first opening 39a to a first space section 36a being one space section of the interior. In the present embodiment, the first opening 39a is formed to a cutout shape extending through the side plate 43 and the ceiling plate 46. That is, the first opening 39a is opened into the top and the side of the first storage section 35a, and allows access to the first space section 36a from the side catwalk section 31 on the side of the machine body 11, or on the right side in the present embodiment. In the illustrated example, the first opening 39a is located in front portion of the first storage section 35a and is formed longitudinally in the left-right direction.

The first opening 39a can be opened/closed by a first opening/closing body 40a, which is one opening/closing body. The first opening/closing body 40a may have any desired opening/closing structure, but in the present embodiment, the first opening/closing body 40a is attached to the ceiling plate 46 by hinges 47 and can be opened/closed in vertical direction. In the illustrated example, the hinges 47 are located on the left side, i.e., at a center side in the width direction of the first opening/closing body 40a, and the first opening 39a is opened/closed by the right edge portion of the first opening/closing body 40a turning in the vertical direction. Further, the ceiling plate 46 on the rear portion of the first opening 39a is covered with a first nonslip section 48, which is one nonslip section.

In the present embodiment, the first storage section 35a is a tank storage section which stores a tank as a first stored object, which is one stored object. For example, in the first space section 36a in the interior of the first storage section 35a, there is stored a urea tank 49, which is a storge tank.

The urea tank 49 is connected to an exhaust gas treatment equipment which treats an exhaust gas of the engine via piping, and stores urea used in the exhaust gas treatment equipment. At least a portion of the urea tank 49 is located facing the first opening 39a. Consequently, the urea tank 49 can be accessed from the first opening 39a while the first opening/closing body 40a is opened.

The second storage section 35b is located adjacent to the rear side of the first storage section 35a in the toolbox 30. The second storage section 35b is arranged on the right side of the upper revolving body 14, which is the outer edge portion of the machine body 11, between the first storage section 35a and a power unit section 50 acting as a maintenance section located at the rear. That is, the second storage section 35b is located adjacent to the power unit section 50 side with respect to the first storage section 35a.

The power unit section 50 includes, for example, an engine, a pump, a generator, a battery, a hydraulic tank, a fuel tank, a cooling device, etc., and is covered with an openable/closable lid section 51. In the present embodiment, a catwalk section 52 is formed between the power unit section 50 and the second storage section 35b. That is, the catwalk section 52 is adjacent to the front side of the power unit section 50, and the second storage section 35b (toolbox 30) is adjacent to the front side of the catwalk section 52. The catwalk section 52 is set at a position lower than the lid section 51 of the power unit section 50.

In the illustrated example, the second storage section 35b is formed in a box shape. The second storage section 35b has a pair of left and right-side plates 53, 54, a pair of front and rear end plates 55, 56, and a ceiling plate 57, and is mounted on the revolving frame 14a of the upper revolving body 14 so as to protrude upward from the side catwalk section 31. Further, in the present embodiment, the height of the storage section 35 closer to the power unit section 50 is set to be higher. In other words, the height of the second storage section 35b close to the power unit section 50 is higher than the height of the first storage section 35a far from the power unit section 50. In the present embodiment, the height of the second storage section 35b is higher than the first storage section 35a and lower than the catwalk section 52. Consequently, the height is increased stepwise in the order of the side catwalk section 31, the ceiling plate 46 of the first storage section 35a, the ceiling plate 57 of the second storage section 35b, the catwalk section 52, and the lid section 51 of the power unit section 50. The ceiling plates 46 and 57, which are the upper portions of the toolbox 30, form the steps extending from the side catwalk section 31 to the catwalk section 52.

In the present embodiment, the side plates 53, 54 are integrally formed with the side plates 42, 43 of the first storage section 35a. The side plate 54 is formed with a side rail 59 extending to the catwalk section 52, which is a gripped body gripped when ascending or descending to or from the catwalk section 52. In addition, the end plate 55 is formed integrally with the end plate 45 of the first storage section 35a, and extends upward from the end plate 45.

Then, the second storage section 35b has a second opening 39b being another opening, and permits access from the exterior of the toolbox 30 via the second opening 39b to a second space section 36b being another space section of the interior. In the present embodiment, the second opening 39b is formed in the side plate 54. That is, the second opening 39b is opened into the side of the second storage section 35b, and allows access to the second space section 36b from the side catwalk section 31 on the side of the machine body 11, or on the right side in the present embodiment. In the illustrated example, the second opening 39b is located at the rear portion of the second storage section 35b.

The second opening 39b can be opened/closed by a second opening/closing body 40b which is another opening/closing body. The second opening/closing body 40b may have any desired opening/closing structure, but in the present embodiment, the second opening/closing body 40b is attached to the side plate 54 by hinges and can be opened/closed in left-right direction. In the illustrated example, the hinges are located at rear edge side of the second opening/closing body 40b so as to open and close the second opening 39b by turning the front portion of the second opening/closing body 40b in the left-right direction. Also, the ceiling plate 57 is covered with a second nonslip section 61 being another nonslip section.

In the present embodiment, the second storage section 35b is a tool storage section which stores tools and the like as a second storage object, which is another stored object. For example, in the second space section 36b in the interior of the second storage section 35b, maintenance tools, containers such as cans containing oils and fats, or parts such as replacement pins can be stored.

Then, the storage space section 37 is formed so as to communicate with the first space section 36a of the interior of the first storage section 35a and the second space section 36b of the interior of the second storage section 35b in the front-rear direction. That is, the storage space section 37 is formed by opening a communication opening 63 at least at a portion of the end plate 45 serving as a partition between the first storage section 35a and the second storage section 35b. The front portion of the storage space section 37 is a portion of the first space section 36a, and the rear portion of the storage space section 37 is a portion of the second space section 36b. Consequently, the storage space section 37 is formed in a longitudinal shape having a total length of the first space section 36a and the second space section 36b in the front-rear direction.

Further, the storage space section 37 is formed so as to communicate with at least the center side of the machine body width of any ones of a plurality of interiors adjoining one another of the plurality of storage sections. In the present embodiment, the storage space section 37 is formed so as to communicate with the left side of, the first space section 36a of the first storage section 35a, and the second space section 36b of the second storage section 35b, i.e., the working device 12 (FIG. 5) side. That is, the storage space section 37 is disproportionately located closer to the working device 12 (FIG. 5) side or the cab 15 side in the toolbox 30.

The storage space section 37 can be accessed from the exterior of the toolbox 30 through an access opening 65. The access opening 65 is located at a different position from the first opening 39a and the second opening 39b, respectively. In the present embodiment, the access opening 65 is formed in the ceiling plate 46 of the first storage section 35a. In the illustrated example, the access opening 65 is formed on the left side edge portion of the ceiling plate 46, i.e., on the edge portion opposite to the first opening 39a. Preferably, the access opening 65 is formed in a longitudinal shape along the front-rear direction, which is the longitudinal direction of the storage space section 37. The access opening 65 may be formed at any desired position accessible for a worker, but in the present embodiment, the access opening 65 is formed so as to extend through the almost whole length in the front-rear direction of the ceiling plate 46. Consequently, the access opening 65 is located adjacently on the left side, to the first opening 39a and the first nonslip section 48.

Figure 1A:
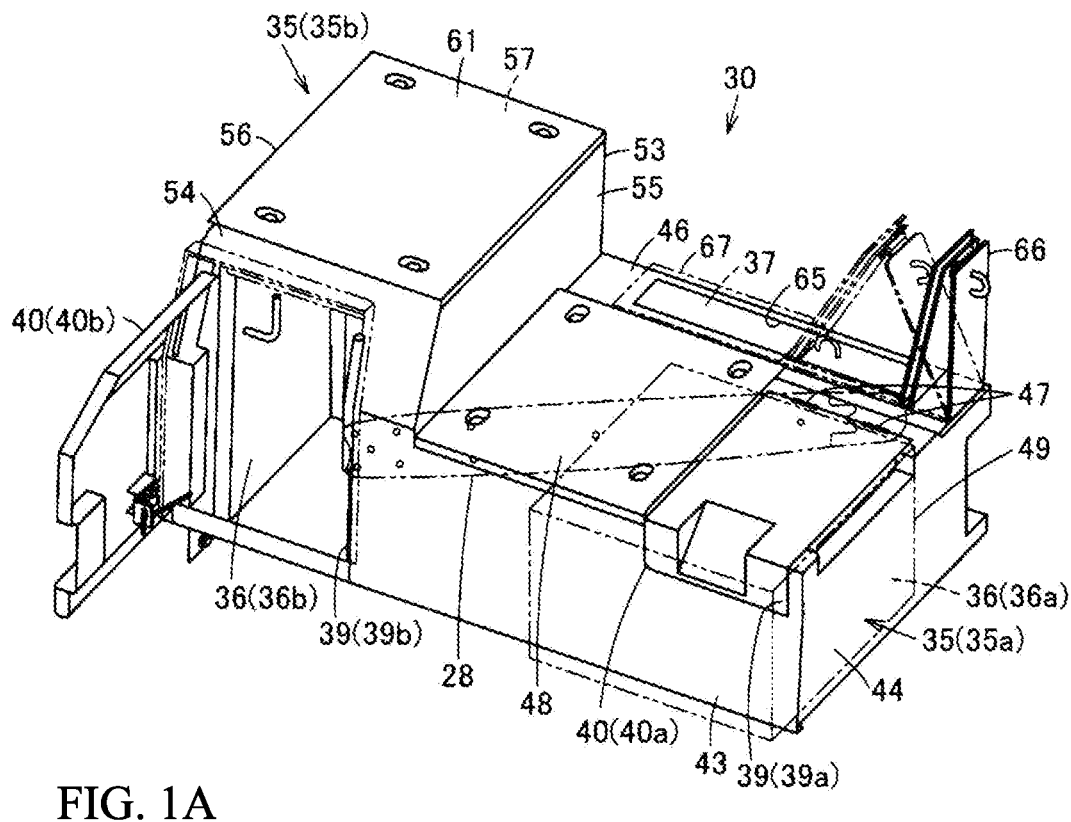
FIG. 1A is a perspective view illustrating an embodiment of a storage structure for working machine according to the present invention.
Figure 1B:
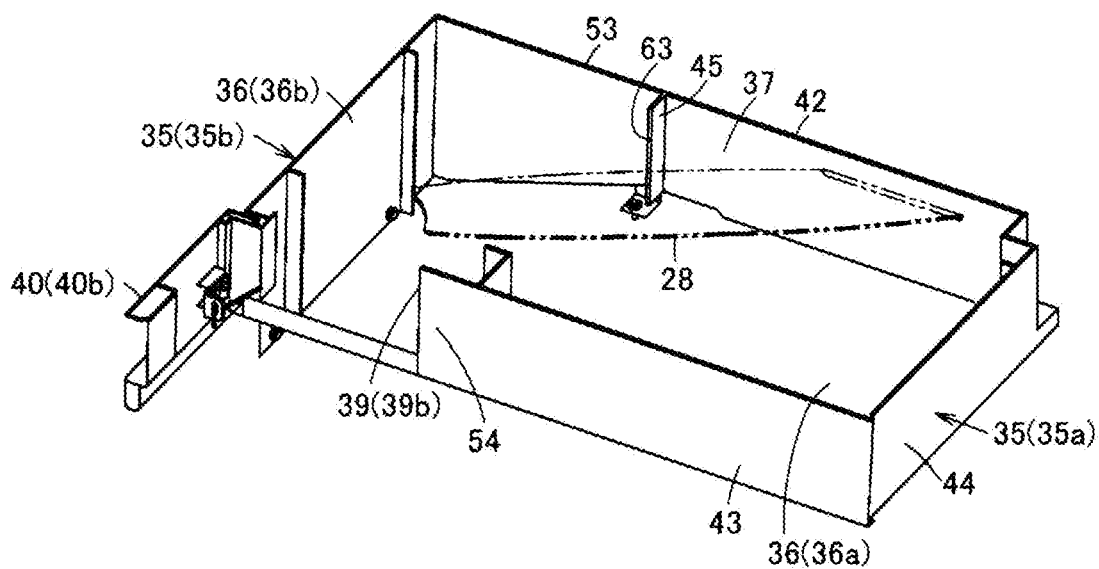
FIG. 1B is a cross-sectional view of the embodiment of FIG. 1A.

The access opening 65 is opened/closed by an access opening/closing body 66. The access opening/closing body 66 may have any desired opening/closing structure. In the present embodiment, however, the access opening/closing body 66 is formed in a folding door shape, and as illustrated by alternate long and two short dashed lines in FIG. 1A, is designed to open the access opening 65 while being folded and sliding forward along the ceiling plate 46. Such a configuration secures an opening/closing space of the access opening/closing body 66. Further, in the present embodiment, the access opening/closing body 66 is formed with an opening/closing body nonslip section 67, and the opening/closing body nonslip section 67 is adapted to configure an integral nonslip section being adjacent to the first nonslip section 48 while the access opening 65 is closed.

Next, the action and the effect of the illustrated embodiments will be described.

The worker can access to a first stored object stored in the first space section 36a of the first storage section 35a from the first opening 39a by opening the first opening/closing body 40a. In the present embodiment, when the worker first ascends to the side catwalk section 31, and opens the first opening 39a by turning upward the first opening/closing body 40a, then the worker can access to the urea tank 49 being the first stored object. Consequently, the worker can perform maintenance work such as supplying urea to the urea tank 49 and checking the remaining amount of the urea tank 49.

Similarly, the worker can access to a second stored object stored in the second space section 36b of the second storage section 35b from the second opening 39b by opening the second opening/closing body 40b. In the present embodiment, when the worker first ascends to the side catwalk section 31, and opens the second opening 39b by turning backward the second opening/closing body 40b, then the worker can access to a tool or the like being the second stored object. Thus, the worker can take out the tool and perform various works.

Here, in the case of work using the attachment 16 for forestry applications, there is a concern that the guide blade 28 of the cutting attachment 26 of the attachment 16 may be worn or damaged due to felling or cutting trees or the like. For this reason, it is desirable to store a spare guide blade 28 in the toolbox 30. However, since the guide blade 28 is a long object, it has a length difficult to be stored in the first space section 36a of the first storage section 35a, and the second space section 36b of the second storage section 35b, respectively.

Thus, in the present embodiment, in the toolbox 30, the interiors of the first storage section 35a and the second storage section 35b adjacent to each other, of the plurality of storage sections 35, are communicated with each other, and there is provided the storage space section 37 that permits access from the access opening 65 different from each opening 39. Consequently, the storage space section 37 can be set to have a length extending through the interiors of the plurality of storage sections 35; in the present embodiment, a length extending through the interiors of the first storage section 35a and the interior of the second storage section 35b, so that a long object can be stored in the storage space section 37 and taken out from the storage space section 37 through the access opening 65. In the present embodiment, the worker ascends to the ceiling plate 46, and opens the access opening/closing body 66, then becomes able to store the long object in the storage space section 37 from the access opening 65, and take it out from the storage space section 37. Consequently, it is possible to mount the spare guide blade 28 and a long tool, for example such as an ax with a long handle on the working machine 10, by using the storage space section 37, and it is not necessary to transport these separately, and at the same time, it becomes possible to quickly replace the guide blade 28 at the work site, and perform work with the long tool.

In addition, by forming the access opening 65 into a longitudinal shape along the longitudinal direction of the storage space section 37, it becomes easy to insert the long object into the storage space section 37.

In order to make it possible to store the long object with longer-length in the storage space section 37, the long object may be stored in an inclined way with respect to the storage space section 37. For example, by arranging a support that supports the long object in an inclined way in the interior of the storage space section 37, the storage space section 37 can be used diagonally to store the long object with longer-length in the storage space section 37, and at the same time, by inclining the long object so that one end thereof be close to the access opening 65, it becomes easy to take out the long object from the access opening 65.

Further, in the forestry industry, since the working machine 10 is likely to vibrate greatly because it travels on an unleveled mountain road, it is preferable to form a means for fixing the long object to be stored in the storage space section 37. For example, by forming a hole portion for passing the fixing member therethrough, or auxiliary fixing tool such as a hook for hooking the fixing member in the storage space section 37, in order to fix the long object to the storage space section 37 using a band or a string-like fixing member, it becomes possible to stably fix the stored long object.

In addition, the first storage section 35a and the second storage section 35b are arranged successively adjacently from the outer edge portion of the machine body 11 toward the power unit section 50 side, and at the same time, by setting the height of the second storage section 35b close to the power unit section 50 to be higher than the height of the first storage section 35a which is far from the power unit section 50, the step for accessing to the power unit section 50 from the outer edge portion of the machine 11 can be configured by the first storage section 35a and the second storage section 35b. Consequently, the use of the first storage section 35a and the second storage section 35b as catwalk enables easy access to the power unit section 50 and maintenance of the power unit section 50.

Moreover, in a configuration of arranging the toolbox 30 in the front portion of the upper revolving body 14 of the machine body 11, setting relatively low the height of the first storage section 35a located relatively in the front side prevents the front portion of the toolbox 30 from interfering with the operator's field of view, when viewed from the driver's seat inside the cab 15, and can secure the operator's visibility in the right forward and downward direction.

Further, arranging the first storage section 35a and the second storage section 35b on the side portion of the machine body 11 allows access to the interior from the first opening 39a and the second opening 39b, from the side of the machine body 11; in the present embodiment, from the right side. As a result, by forming the storage space section 37 to communicate with locations on the center side of the machine body width, i.e., on the left side opposite to the side of the machine body 11 of the interior of the first storage section 35a and the interior of the second storage section 35b, the long object stored in the storage space section 37 does not interfere with the access to the first stored object to be stored in the interior of the first storage section 35a and the second stored object to be stored in the interior of the second storage section 35b. In particular, since the urea tank 49 stored in the interior of the first storage section 35a needs to be accessed more frequently than the long object stored in the storage space section 37, workability can be ensured by preventing the long object stored in the storage space section 37 from interfering with the access to the urea tank 49.

In one embodiment described above, the storage space section 37 is to be formed such that the interiors of the plurality of storage sections 35 are communicated with one another by a communication opening 63 opened in advance, but without being limited to this, an opening/closing member capable of opening/closing the communication opening 63 may be provided, and the storage space section 37 may be formed by the interiors of the storage sections 35 being communicated with one another only when the opening/closing member is opened.

Further, the toolbox 30 is configured to comprise two storage sections 35: the first storage section 35a and the second storage section 35b, but without being limited to this, the toolbox 30 may be configured to comprise three or more storage sections 35. In this case, the storage space section 37 can exhibit the same action and effect as those of the above-described embodiment, by forming the storage space section 37 so as to communicate with the interiors of at least two storage sections 35 adjoining one another, of these storage sections 35.

Further, the maintenance section, without being limited to the power unit section 50, may target at any other maintenance section.

INDUSTRIAL APPLICABILITY

The present invention has industrial applicability for business operators engaged in the manufacturing business, selling business of forestry working machines.

What is claimed is:

1. A storage structure on a forestry machine provided in a machine body of the forestry machine, the forestry machine including a chainsaw attachment and a replacement chainsaw blade stored in the storage structure, the storage structure for the forestry machine comprising:
   a plurality of storage sections each having an opening that permits access to an interior, and each storage section successively adjacently arranged, at least one storage section is a longitudinal storage space section configured for storing the replacement chainsaw blade, including an inclined support arrangement within for storing the replacement chainsaw blade; and
   a storage space section that makes any ones of a plurality of interiors adjoining one another of the plurality of storage sections communicate with one another, and permits access from an access opening different from each opening, including an adjustable partition having a selectively openable communication opening to form the longitudinal storage space section, and the access opening is formed in a longitudinal shape along the direction of the longitudinal storage space section for easy insertion and removal of the replacement chainsaw blade.

2. The storage structure on a forestry machine according to claim 1, wherein the plurality of storage sections are successively adjacently arranged from an outer edge portion of the machine body toward a predetermined maintenance section side of the machine body, and the height of a first storage section closer to the predetermined maintenance section than a second storage section is set to be higher than the second storage section.

3. The storage structure on a forestry machine according to claim 2, wherein the plurality of storage sections are arranged in a side of the machine body,
   each opening is formed so as to allow access to the interior of each storage section from the side of the machine body, and
   the storage space section is formed so as to communicate with at least a center of the side of the machine body width of any ones of a plurality of interiors adjoining one another of the plurality of storage sections.

4. The storage structure on a forestry machine according to claim 1, wherein the plurality of storage sections are arranged in a side of the machine body,
   each opening is formed so as to allow access to the interior of each storage section from the side of the machine body, and
   the storage space section is formed so as to communicate with at least a center of the side of the machine body width of any ones of a plurality of interiors adjoining one another of the plurality of storage sections.

5. The storage structure on a forestry machine according to claim 1, wherein the inclined support arrangement is configured to allow the replacement chainsaw blade to be stored diagonally within the longitudinal storage space section.

* * * * *